(No Model.) 2 Sheets—Sheet 1.
J. WEEKS.
UMBRELLA.
No. 416,657. Patented Dec. 3, 1889.
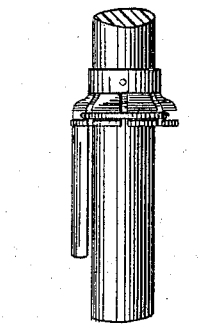
FIG.1.
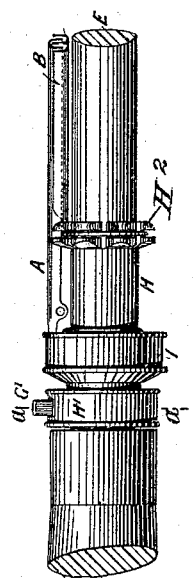
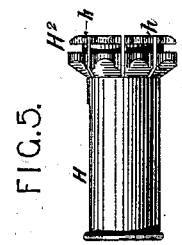
FIG.5.
FIG.4.
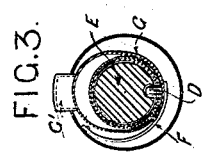
FIG.2.
FIG.3.
FIG.10.
FIG.9.
FIG.6.
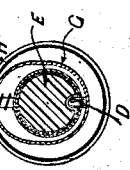
FIG.7.
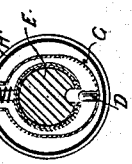
FIG.8.
Attest:
W. E. Boulter
E. M. Gallaher
Inventor:
John Weeks,
by Henry W___
Attorney (No Model.) 2 Sheets—Sheet 2.
J. WEEKS.
UMBRELLA.
No. 416,657. Patented Dec. 3, 1889.
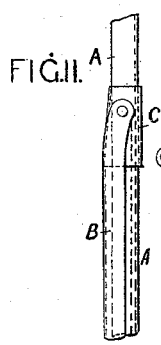
FIG.11.
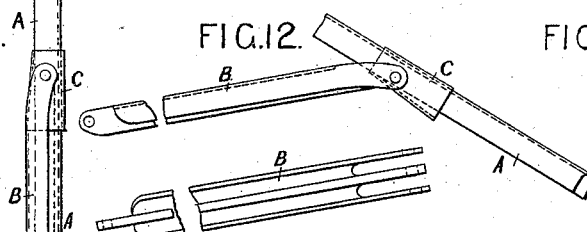
FIG.12.
FIG.13.
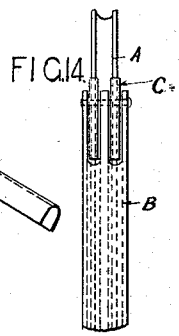
FIG.14.
FIG.15.
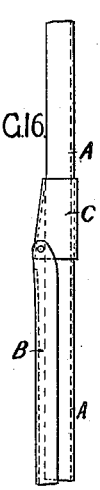
FIG.16.
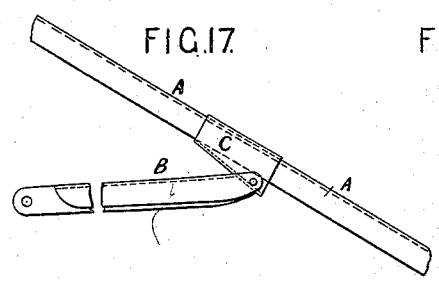
FIG.17.
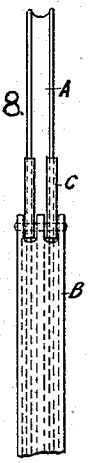
FIG.18.
FIG.19.
FIG.20.
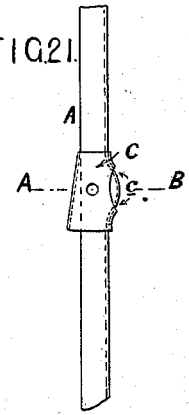
FIG.21.
FIG.22.
Attest:
W. E. Poulter
C. M. Gallaher
Inventor:
John Weeks
by  Henry Orth
attorney

UNITED STATES PATENT OFFICE.

JOHN WEEKS, OF LONDON, ENGLAND.

UMBRELLA.

SPECIFICATION forming part of Letters Patent No. 416,657, dated December 3, 1889.

Application filed May 31, 1887. Serial No. 239,863. (No model.) Patented in England November 4, 1886, No. 14,228, November 8, 1886, No. 14,417, and April 16, 1887, No. 5,565; in France May 20, 1887, No. 183,685; in Belgium May 20, 1887, No. 77,522, and in Germany May 21, 1887, Nos. 42,955 and 44,552.

*To all whom it may concern:*

Be it known that I, JOHN WEEKS, a subject of the Queen of Great Britain, residing at London, England, have invented new and useful Improvements in Umbrellas and Similar Articles, (for which I have obtained Letters Patent in Great Britain under the respective numbers and dates, viz: No. 14,228, dated November 4, 1886, No. 14,417, dated November 8, 1886, and No. 5,565, dated April 16, 1887; in France, No. 183,685, dated May 20, 1887; in Belgium, No. 77,522, dated May 20, 1887, and in Germany, No. 44,552, dated May 21, 1887, and No. 42,955, dated May 21, 1887,) of which the following is a specification.

Umbrellas and similar articles constructed according to this invention possess several important advantages as compared with the best existing constructions.

The main objects attained by my invention are increased strength of frame, compactness of all the working parts, so that the umbrella folds in the smallest possible compass, prevention of abrasion of the stick by the rubbing of the frame-joints against it, as heretofore usual, increased strength of the stick and runner, and a very much neater appearance of the whole umbrella.

I shall first describe the improved runner and then the improved frame.

Figure 1 is a side view of the umbrella-stick with top notch and runner and with one rib and stretcher shown in the folded position, so as to show the improved construction of the parts clearly. Fig. 2 is a longitudinal section through the runner; and Fig. 3 a vertical cross-section on line *a a*, Fig. 1—that is to say, through the catch part of the same. Fig. 4 is an end view of the notch part of the runner. Fig. 5 is a side view of a runner with my improved notch part. Fig. 6 is a side view of a runner with a modified form of my catch. Fig. 7 is a cross-section through the catch part; and Fig. 8 a similar view, but with the catch-knob shown in the depressed condition. Fig. 9 is a cross-section through a T-shaped stretcher, which I can use with my invention, and Fig. 10 is a cross-section through a double trough-shaped stretcher, which I prefer to use in both cases in combination with a U-shaped rib, the stretcher and rib folding into each other. Fig. 11 is an enlarged view of the joint part of a U-shaped rib and the double trough stretcher in the folded condition of the umbrella, and Fig. 12 a like view of these parts in the open condition. Fig. 13 is a plan view of the stretcher, and Fig. 14 an edge view of the stretcher and rib. Fig. 15 is a cross-section through rib and stretcher, showing how they fold or interlock with each other in the folded condition of the umbrella. Figs. 16, 17, 18, and 19 are corresponding views of a similar rib and stretcher with a modified form of connecting-joint. Fig. 20 is a side view of a rib with an improved formation of the part of same that connects with the stretcher, and Fig. 21 is a side view of the same with the geat or joint part fitted thereto ready for connection with the stretcher. Fig. 22 is a cross-section on line A B, Fig. 21.

Referring to Figs. 1, 2, 3, and 4, the runner is provided with a sliding peg or part D, which enters a corresponding recess in the stick E, as seen in Fig. 3, when the umbrella is in the closed condition, as shown, or in the open condition. The peg D is held in by means of a spring F, bearing against an elliptical ring G, in which the peg D is fixed, and which is inclosed in the enlarged part H' of the runner. The spring F is at one end fixed to the interior of the said part H'. By depressing the knob G', which in this instance forms part of the ring G, against the spring F, the peg B is taken out of its recess in the stick E, and the runner H can then be freely slid along the stick for opening (or closing) the umbrella. By this construction the stick is not so weakened as with the ordinary form of stick with recess for the catch-spring. I have in this instance shown the runner with a spring tip-cap I, of ordinary form, and working on the runner between the aforesaid inclosed hand-spring and elliptical ring and the notch H², and taking over the tips on the U-shaped ribs A, which are recessed in the notch, as shown at *h*, Figs. 1 and 4, so as to reduce the size of the cap, as also shown in Fig. 5, applied to a runner without the enlarged part H', or of ordinary form.

Figs. 6, 7, and 8 show a modified form of my runner. In this case the spring F is helical and inclosed in the knob part G' of the elliptical ring G. In Fig. 7 the knob G' is in the normal position, and in Fig. 8 in the depressed position for release.

Referring next to Figs. 9 to 22, I shall now describe my other improvements on the frame of the umbrella.

I have found that the combination of a double trough-shaped stretcher with a trough-shaped rib in such a manner that these fit into one another when the umbrella is closed presents manifold advantages, which can be attained by various modifications of the rib and stretcher-joint, and as hereinafter described. I provide, also, that the geat or joint piece shall be of such a form as to avoid abrasion of the umbrella-stick when the umbrella is closed. I provide, also, for strengthening the rib near the stretcher-joint by forming a small bulge upon the rib at that point. I also provide a solid three-forked prong upon the end of the double trough-shaped stretcher, by means of which it can be securely connected to the rib. Some of my improvements can be used separately or in combination under different circumstances, as hereinafter appears.

In the figures, A represents the trough-shaped rib; B, the T or double trough-shaped stretcher, and C the geat or joint piece.

Figs. 9 and 10 show two sections of forms of stretcher which may be used; but I prefer the latter, as a new or improved form, whereby I am enabled to obtain a solid three-pronged fork at the end of the stretcher for the attachment of the stretcher to the rib. Hitherto where a single trough-shaped stretcher has been used a middle bit had to be soldered or otherwise secured in the trough in order to get a three-pronged fork; but a solid three-pronged fork fashioned out of one piece of metal has never before been used.

Figs. 11, 12, 13, 14, and 15 show this my new or improved frame arrangement, in which a double trough-shaped structure B is combined with a trough-shaped rib A. In this case the fork-joint has three prongs formed out of the stretcher and in one piece therewith. In this arrangement the hole for the pin or rivet is pierced through both the geat C and the rib A. Figs. 16, 17, 18, and 19 show similar arrangements in which the hole for the joint pin or rivet does not pass through the rib A, but only through the projecting and folded portion of the geat C.

In both the preceding arrangements—that is to say, Figs. 11 to 15 and Figs. 16 to 19—it will be seen that the geat C differs from the ordinary geat in being tapered off to the line of the rib toward the point of the umbrella, so that abrasion of the stick by a projecting corner of the geat when the umbrella is closed is avoided.

Figs. 20, 21, and 22 show the method of strengthening the rib which I sometimes adopt when the hole for the pin is pierced through the substance of the rib. I produce by means of suitable tools a bulge in the rib A, as shown, so that the width of the margin of metal around the hole is increased and the rib is rendered less liable to fracture at the point where the rib is pierced by the hole for the rivet. The geat C may be secured in position as shown in Figs. 21 and 22. The geat is by preference cut out as shown at $c$ in Figs. 21 and 22, in order to save needless increase in bulk at this place.

I claim—

1. In an umbrella, the combination, substantially as described, of the double trough-shaped stretcher B, with a U or trough shaped rib having a recess in the bottom of its trough and an outward bulge at the stretcher-joint, substantially as described, for the purposes specified.

2. In an umbrella, the double trough-shaped stretcher B, having a three-pronged fork formed in one piece therewith for connecting it to the rib A, substantially as described, for the purpose set forth.

3. In an umbrella, the trough-shaped rib A, having a recess in the bottom of its trough and an outward bulge at the stretcher-joint, the curve of the said recess being struck from the interior of the U or trough, as described, for the purpose specified.

4. In an umbrella, the combination, with a trough-shaped rib having an outward bulge at the stretcher-joint formed by forcing the metal of the bottom of the trough outward, leaving the sides and top edges straight, of a geat lapped around the rib and provided with a slot through which the bulged-out bottom of said rib projects, substantially as and for the purposes specified.

5. In an umbrella, the combination, with a U-shaped rib A, having the outward bulge formed thereon at the stretcher-joint, of a geat lapped round said rib and provided with an opening or slot through which said bulge projects, as and for the purpose set forth.

6. The U-shaped umbrella-rib A, in combination with the double trough-shaped stretcher B and its three-pronged fork-joint end formed of one piece, and the geat C, the stretcher being pivoted to the rib and the pivot passing through the geat, substantially as and for the purpose specified.

7. In an umbrella, the combination, with the trough-shaped ribs A and the runner provided with the part $H^2$, said part $H^2$ having narrow slits or recesses $h$, one for each side of said ribs, and into which slits or recesses the rib-edges fold when the umbrella is closed, of the cap I, mounted and sliding on the runner, for confining the ends of the ribs, substantially as described.

8. In an umbrella, the ribs A, in combination with a runner having the part $H^2$, provided with two recesses or notches $h$ for the reception of the two sides of the ribs, substantially as described.

9. In an umbrella, the combination, with the stick provided with recesses, as described, of the runner H, having the enlarged portion H', the ring G, provided with a pin or stud adapted to enter the recesses in the stick, and a spring acting upon said ring to force the pin or stud within one of the recesses of the stick when the umbrella is opened or closed, all of said parts being arranged for co-operation substantially as and for the purpose specified.

10. The combination, with the umbrella-stick provided with recesses, as described, of the runner H, having the enlarged portion H', the ring G, mounted within said portion and provided with a knob projecting through an opening in said part H', a pin or stud carried by ring G and adapted to enter the recesses in the stick, and a spring acting upon said ring to force the pin or stud within one of the recesses when the umbrella is opened or closed, all of said parts being arranged for co-operation substantially as and for the purpose specified.

JOHN WEEKS.

Witnesses:
GEO. J. B. FRANKLIN,
W. J. NORWOOD.